United States Patent [19]

McCann et al.

[11] 4,100,318
[45] Jul. 11, 1978

[54] ACTINIC RADIATION CURED COATING FOR CUSHIONED SHEET GOODS AND METHOD

[75] Inventors: Thomas J. McCann, Hollywood; Ernest E. Regan, Ft. Lauderdale, both of Fla.

[73] Assignee: Dowdflor Corporation, Miami, Fla.

[21] Appl. No.: 754,431

[22] Filed: Dec. 27, 1976

[51] Int. Cl.² .............................................. B05D 3/06
[52] U.S. Cl. ...................................... 428/159; 427/54; 427/333; 427/53; 427/373; 427/407 R
[58] Field of Search ............. 427/54, 333, 373, 407 R, 427/53; 428/315, 158, 159, 160

[56] References Cited

U.S. PATENT DOCUMENTS

| | | | |
|---|---|---|---|
| 3,293,094 | 12/1966 | Nairn et al. | 428/158 |
| 3,453,171 | 7/1969 | Crowley | 428/159 |
| 3,924,023 | 12/1975 | Boranian et al. | 427/54 |
| 3,984,606 | 10/1976 | Morgan | 427/54 |

*Primary Examiner*—John H. Newsome
*Attorney, Agent, or Firm*—Jack E. Dominik

[57] ABSTRACT

Application of an actinic radiation curable coating which is essentially solvent free and comprises at least one organic compound having at least two photopolymerizable ethylenically unsaturated groups per molecule to a cushioned vinyl product comprising an expanded vinyl foam and clear vinyl overlay atop a carrier where a decorative pattern is usually present. The coating is fully reacted upon exposure to actinic radiation resulting in a tack-free surface essentially free from imperfections and property weakening voids. The actinic radiation coated cushioned sheet goods has improved stain resistance, gloss retention, scratch and abrasion resistance. The preferred application areas are sheet vinyl floor and wall coverings.

38 Claims, 3 Drawing Figures

ACTINIC RADIATION CURED COATING FOR CUSHIONED SHEET GOODS AND METHOD

FIELD OF INVENTION

The present invention relates to cushioned sheet goods, primarily used as flooring. In particular, it is directed to a clear, durable wear layer, with stain resistant properties, scratch and scuff resistance as well as wear properties, which are superior. The subject flooring may be printed to simulate tile, or other repetitive patterns. In addition, the same is expanded to provide a cushion like construction, and may also be embossed to simulate relief such as ceramic tile, parquet floor, grouting, and the like. The invention is directed to the method of producing such flooring and the product itself.

SUMMARY OF THE PRIOR ART

In the production of commercially acceptable wall, floor, or table coverings, it has been found necessary to provide a protective coating over the decorative surface. The protective wear resistant coatings normally used are compounded from clear, flexible vinyl systems. Vinyl coatings can be formulated which have good stain resistance and wear properties. However, vinyl coatings have limited optical high gloss properties, with the vinyl resins currently available. Furthermore, vinyls wear properties are such that with heavy traffic on a floor, the gloss retention capabilities are reduced.

Urethane based coatings are available which have excellent wear resistance, as well as weathering capabilities. Urethane coatings, because of their inherent toughness and inherent high gloss finish, are successfully replacing vinyl coatings in many applications.

The currently available urethane coatings, particularly for cushioned vinyl flooring, are primarily solvent based "moisture cured systems." Moisture cured urethane systems generally contain appropriate portions of reactive polyols and isocyanates and catalysts. When the same are exposed to elevated temperatures and moisture they will react to form tough wear resistant films.

Moisture cured urethane systems presently available have many drawbacks and limitations. The urethane prepolymers are terminated by isocyanate groups (NCO) which are very unstable and highly water sensitive. They react with moisture to form a carbon dioxide gas and amino groups which can then react with —NCO to form highly viscous insoluble urea extended networks. If this happens, the material must be discarded at great expense. —NCO prepolymers are very reactive with acidic or basic impurities forming dimers and trimers of —NCO functions which sometimes form insoluble products on storage and must be discarded.

Further limitations of polyurethane prior art coatings for flooring applications arise because the aliphatic polyisocyanates such as hexamethylene diisocyanate must be used. The aromatic diisocyanate, 4,4'-diisocyanatodiphenylmethane and the like are sensitive to sunlight and turn amber, orange or brown when exposed to actinic radiation.

While the aliphatic polyisocyanates exhibit good light stability and will not yellow as the aromatic polyisocyanates, they are difficult to manufacture, are relatively expensive, and are relatively slow in reaction rate.

In-Line coating problems which can occur with moisture cured urethanes are many. Firstly, because moisture cured urethane systems contain solvents which are rapidly evolved during the curing stage, adequate leveling of the coating is difficult. Also, with this rapid evolution of solvent during curing the physical bonding properties of the urethane to the clear vinyl are generally poor, necessitating a tie coat in order to eliminate the problems of delamination. Secondly, because of the difficulty in removing last traces of solvent from the coating and because of carbon dioxide gas being liberated during curing (NCO groups reacting with $H_2O$) unsightly surface pitting and property weakening voids are commonplace in the finished product. Thirdly, moisture cured urethane systems rely on the moisture content in the air for curing performance and because the moisture content in the air varies widely, the complete curing is variable and difficult to control. Hence, such coatings display a surface tackiness, which when employed with a floor covering can attract and hold dirt. Presently available moisture cured urethanes leave a lot to be desired as a top coating for flooring applications because of their inherently poor stain resistance. Finally, moisture cured urethanes require expensive explosion proof ovens and solvent recovery units and involve extra processing steps which are costly.

U.S. Pat. No. 3,924,023 to Boranian et al. teaches the application of a photopolymerizable coating over rigid vinyl asbestos and asphalt tile which when exposed to ultraviolet light in a non-oxidizing environment is reacted to form a clear, durable wear layer. Substrate temperature for exposure to ultraviolet light is in the range of 130° to 180° F.

SUMMARY OF THE INVENTION

The present invention is directed to the production of a superior high gloss cushioned sheet goods flooring product having excellent stain, scratch, abrasion and wear properties that can be accomplished as part of the normal process without adding an extra pass on the equipment. The invention also contemplates applying an actinic radiation curable coating which is essentially solvent free and comprises at least one organic compound having at least two photopolymerizable ethylenically unsaturated groups per molecule to a cushioned vinyl product comprising an expanded vinyl foam and clear vinyl overlay atop a felt carrier where a decorative pattern is usually present allowing for a smooth level top coat with no unsightly pit marks.

The method of the invention contemplates sequentially passing a felt backing through a reverse roll assembly to apply a foamable coat, thereafter passing through a gel oven and into the printer. Preferably at the printer chemical retardants are applied if chemical etching is to be employed. Thereafter, a clear vinyl overlay is applied and the felt with the vinyl there atop is passed to a fusion and expansion oven. Alternatively, mechanical embossing and valley printing may be employed. Subsequently, the web is subjected to some cooling after which a photopolymerizable coating is applied preferably by means of a direct roll coater. The coated web is then passed through an actinic radiation source such as an ultraviolet lamping oven in a non-oxidizing environment supplied by nitrogen or other inert gas. If an air cured system is used, a controlled air sweep is employed. The sheet is then cooled for rolling and shipment.

In view of the foregoing, it is a principal object of the present invention to provide a, non-solvent based, photopolymerizable coating on a cushioned vinyl covering. A further object of the present invention is to provide a photopolymerizable coating which will penetrate the clear vinyl under-surface and chemically crosslink resulting in superior adhesion and eliminate the need for an adhesive or tie coat.

Still another object of the present invention is to provide a photopolymerizable coated vinyl covering which is fully reacted preferably upon exposure to ultra-violet light, resulting in a tack-free surface which does not attract or hold dirt as with solvent based urethane and conventional vinyl systems.

Still another object of the present invention is to provide a photopolymerizable coating on a vinyl covering which is essentially 100% active, thereby minimizing the possibility of the entrapment of volatile components such as solvents, and resulting in a clear surface essentially free from imperfections and property weakening voids in the finished product.

A further object of the present invention is to provide a photopolymerizable system which can be adopted to existing processing by adding a direct roll coater, a bank of medium pressure mercury lamps with appropriate reflectors and shields, along with a gas sweep source. Otherwise essentially the equipment already employed in the processing of cushion vinyl coverings will be employed.

Furthermore, an additional advantage is to provide a photopolymerizable system for cushion vinyl coverings which can be applied without making an extra pass on equipment which is both time consuming and involves further expense.

Still another object of the present invention is to provide a photopolymerizable coating which, when applied over a textured cushion vinyl will accurately conform to the textured surfaces of the underbody and upon exposure to ultra-violet light will cure tack-free to give improved optical, stain, scratch and wear properties.

BRIEF DESCRIPTION OF DRAWINGS

Further objects and advantages of the present invention will become apparent as the following description of the illustrative drawings proceed, along with the description of the product and method in which.

DESCRIPTION OF PRODUCT AND METHOD

Method

Figure 1:
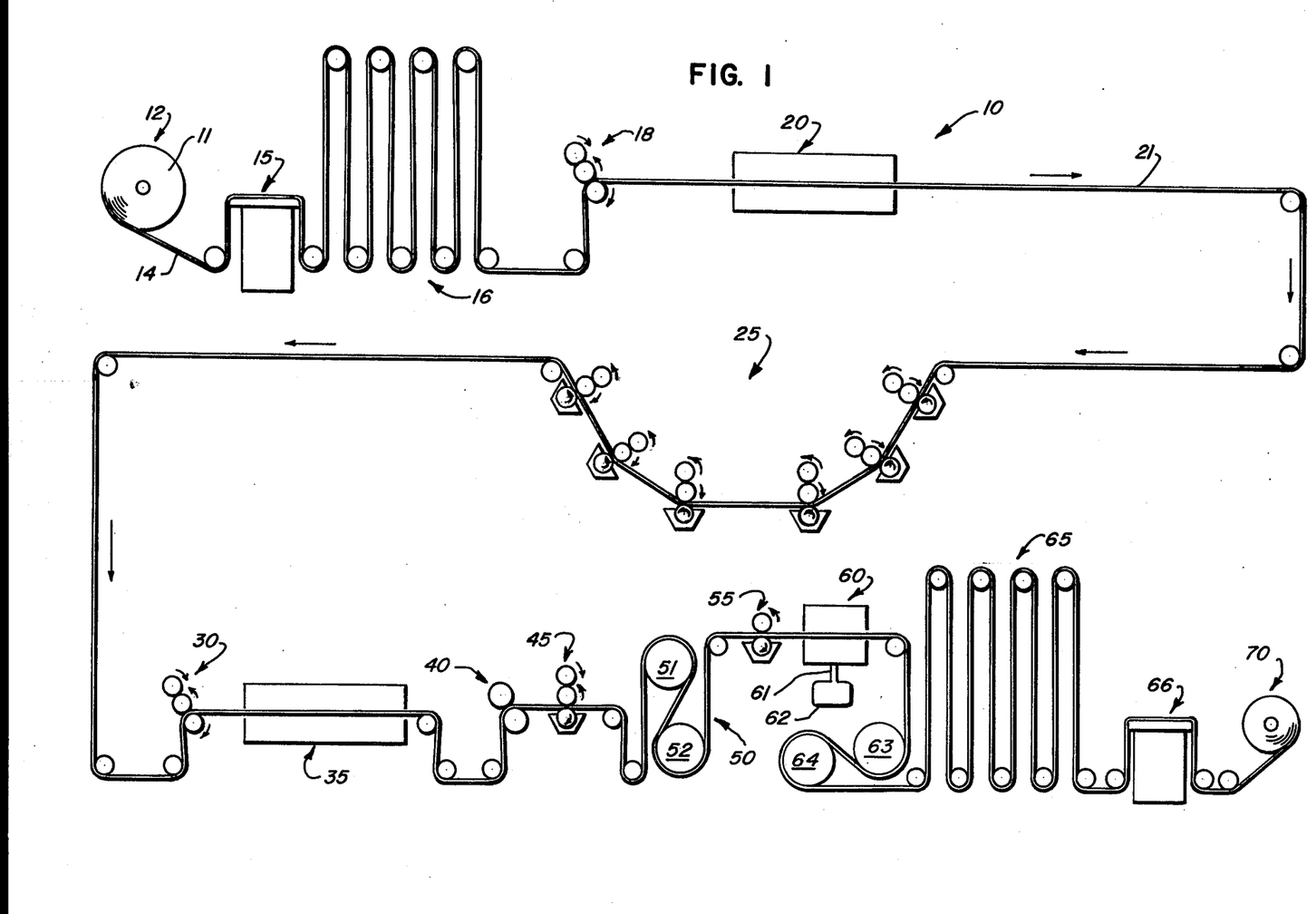
FIG. 1 shows a preferred flow-sheet for the manufacture of the subject product.
Figure 2:
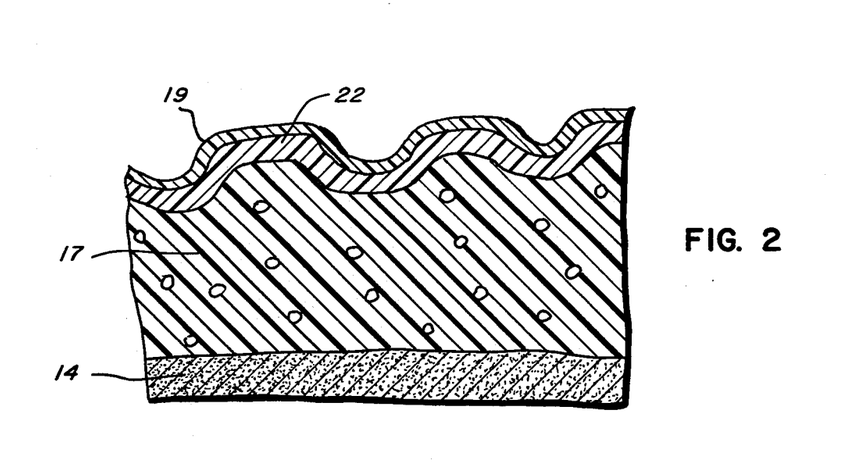
FIG. 2 shows a side-view of the product.
Figure 3:
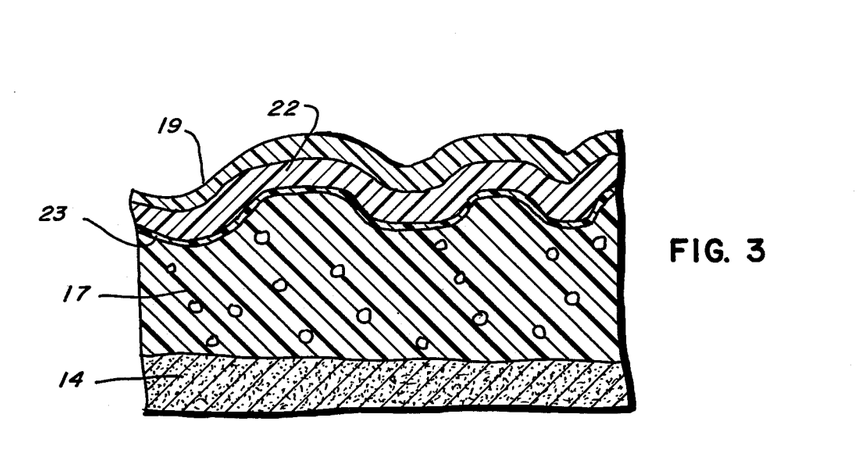
FIG. 3 shows a side-view of a modified form of the product.

For a better understanding of the product, the method or systems in which it is made will first be described as it is shown in FIG. 1 of the drawings. There it will be seen that the flow system 10 contemplates a felt roll 11 which is secured to a felt let off assembly 12. The felt sheet 14 then proceeds over a splicing table 15, where different rolls of felt 11 may be exchanged, accommodated by the accumulator 16. After passing the accumulator 16, the felt is passed through a reverse roll foam coating assembly 18 where the initial gel coat is applied. Thereafter, the coated felt is passed into the gel oven 20, and the coating is set. Subsequently, the gel coat is set sufficiently that the same can be passed through the gravure printer 25. The specific gravure printer shown is a fixed station unit, of which one or more stations may be used to employ chemical inhibitors in connection with chemical etching to form the desired textured finish on the finished product. After passing through the printer 25, the thus decorated vinyl is passed through a reverse roll coating assembly 30 where the clear vinyl overlay 22 is applied. After the vinyl overlay 22 is applied, the web is passed through the fusion and expansion oven 35 and if chemically etched, will upon exiting the oven, the cellular foam 17 has the desired textured surface. However, if optional mechanical embossing is employed upon exiting the expansion oven, the cellular foam 17 is passed through a mechanical embosser 40. After passing through the mechanical embosser 40, the web passes into a valley printer 45, which can print various patterns such as a grouting. Subsequent to the valley printer 45, the material is passed over the cooling drum assembly 50, comprising an upper drum 51, and a lower drum 52. The web is then passed through a direct roll coater assembly and the 100% active photopolymerizable coating 19 is applied at a thickness of 2.5 mils (Ranges between 0.5 mils to 5 mils have been employed.) Even greater thicknesses are contemplated where the particular optical transparency as well as texture wear effect is desired. After exiting the direct roll coater the web then enters the ultra-violet lamping unit 60. Depending on whether the photopolymerizable coating is an aircured system or a system that requires an inert environment, the necessary gas sweep 62 is provided to the lamping unit. After leaving the ultra-violet lamp assembly the coating is completely cured and free of tack, entrapped solvent bubbles, and other surface defects. The web is cooled by passing over cooling rolls 63 and 64 afterwhich it passes through accumulator 65, over a splicing table 66, and onto the finished rolls 70, which are subsequently packaged and stored for shipment for ultimate use by the customer as a floor, table, wall covering and the like. Hereafter where hyphenated terms appear such as ultra-violet, photo-polymerizable, photo-curable, photo-activated, photo-activity, photo-synergists, infrared, multi-functional, mono-functional, photo-initiator, the alternative spelling or abbreviations such as ultraviolet, photopolymerizable, photocurable, photoactivated, photoactivity, photosynergists, infrared, multifunctional, monofunctional, photoinitiator, are contemplated.

THE PRODUCT

The product desirably is a superior high gloss cushioned sheet goods product prepared by the chemical crosslinking of a photopolymerizable coating, upon exposure to actinic radiation, over a textured foamed vinyl product.

The foamed vinyl product and techniques for attaining the textured surfaces are well known and are available for use in preparing the novel products of this invention.

In accordance with known practice, a foamable resinous polymer composition is applied to a base at the desired thickness and then heated to gel the composition to give a presentable printing surface. After printing, a clear vinyl overlay is applied and the composite is then heated under controlled conditions of time and temperature to fuse the resinous layers and expand the foam.

Mechanical embossing of resinous composition sheets is conventionally accomplished with an embossing roll or plate which has been engraved or otherwise treated to create the design desired in raised relief on its surface. The sheet and/or embossing surface is heated and the design pressed into the heatsoftened sheet.

Engraved embossing rolls and plates are expensive to produce, however, and considerable care is required in practice to achieve perfect registration of the embossing and the design. Because of this, there have been many suggested routes to producing cellular foam sheets having embossed surfaces without the aid of mechanical embossing.

Chemical embossing techniques are alternatives to mechanical embossing. A chemical embossing technique is disclosed in U.S. Pat. No. 2,961,332 issued to R. Frank Nairn on Nov. 22, 1960. In accordance with that disclosure, a layer of foamable resinous composition is formed on a base by printing a number of different resinous compositions each containing it's own amount or type of blowing agent. The layer is then heated to decompose the blowing agent and fuse the composition. The product has an angular or textured surface conforming to the amount or type of blowing agent in the various printed compositions. Another method is disclosed in U.S. Pat. No. 2,964,799, which issued to P. E. Roggi, et al., on Dec. 20, 1960. According to that disclosure a foamable resinous composition is formed into a selfsupporting sheet of fused composition. Heat is then applied to the foamable composition sheet at various points to cause the blowing agent at those points to decompose and form a cellular structure. The raised areas in the finished sheet correspond to the points of heat application. U.S. Pat. No. 2,825,282, which was issued to J. B. Gergen, et al., on Mar. 4, 1958, discloses a related method for producing a letterpress makeready. In accordance with this latter disclosure, a foamable composition is formed into a sheet and then printed with inks containing radiant energyabsorbing pigments. On exposure of the sheet to radiant energy, the blowing agent in contact with the pigments receives more intense heat, and therefore, will decompose and form cellular foam without affecting the imprinted portions of the sheet.

Commercial chemical embossing is disclosed in U.S. Pat. Nos. 3,293,094 and 3,293,108, which were issued to R. Frank Nairn et al., in December 1966. In this procedure, the decomposition temperature of a chemical blowing agent dispersed in a resinous polymer composition is controlled by applying an inhibitor to the surface of the composition. The subsequent application of heat to the composition selectively decomposes the blowing agent, thereby resulting in the formation of either depressed or raised areas in the final product at the points of inhibitor application.

Still another chemical embossing technique is disclosed by L. B. Palmer et al., on Aug. 27, 1968. In accordance with his disclosure a resinous layer having an embossed surface is produced by applying a composition containing a blowing agent to portions of the surface of a layer of resinous composition containing an accelerator which substantially lowers the decomposition temperature of said blowing agent, said blowing agent being soluble in at least one component of said resinous composition, allowing a portion of said blowing agent on the surface of said layer to migrate into said layer and contact said accelerator, heating said layer to decompose the portion of the blowing agent in said layer without decomposing the remaining portion of the blowing agent on the surface of said layer, thereby forming raised areas on the surface of said layer which correspond to the areas of application of said blowing agent.

The prior art resinous composition and methods for chemical embossing are well taught in U.S. Pat. No. 3,293,094 and No. 3,293,108. However, a brief discussion of the ingredients and how they are employed in producing a finished cushioned vinyl sheet goods article will serve as good background information for this invention.

The resinous compositions useful to the invention are preferably vinyl plastisol dispersions made up of appropriate amounts of polyvinyl chloride resins, plasticizers, blowing agents, pigments, activators, heat stabilizers, light stabilizers, viscosity depressants. Resins adaptable for use in formulating vinyl plastisols are commonly referred to as dispersion grade resins. Such resins are available having particle sizes of from about 0.2 to about 2 microns. Dispersion grade resins are usually of higher molecular weight than calendar grade resins and have particle surfaces of a hard, horny nature. The preferred molecular weight for the foam grade resin is Relative Viscosity of 2.05. The preferred molecular weight for the clear vinyl overlay is Relative Viscosity of 2.65 and higher.

Plasticizer selection is important in determining the physical properties of the coating and it's rheological characteristics. Esters of straight and branched long chain aliphatic and aromatic alcohols with aliphatic and aromatic acids are utilized depending on properties necessary in the fused form. Esters of aliphatic alcohols and acids impart low viscosity and good viscosity stability. Esters of the aromatic type impart good foaming characteristics to a plastisol. The plasticizer or blend of plasticizers is chosen to yield a composition of the desired viscosity and/or foaming characteristics.

Blowing agents are well known in the art and the particular blowing agent selected usually depends on cost, resin, and density required. Blowing agents are complex organic compounds which when heated, decompose to yield an inert gas and have residues which are compatible with the resin. Preferred blowing agents have the property of decomposition over a narrow temperature range which is particularly desirable to obtain a good foam structure. Typical types of blowing agents which are of significant interest to the invention are substituted nitroso compounds.

Substituted hydrazides ($RSO_2NHNHR'$) substituted azo compounds ($R-N=N-R'$), acid azides ($R-CON_3$), guanyl compounds.

and the like wherein R. and R' are hydrogen or hydrocarbon groups usually containing from one to ten carbon groups.

The blowing agents which have found the most widespread use are those compounds having the N—N or —N=N— linkages which decompose at elevated temperatures to yield an inert gas high in nitrogen. These compounds have the general formula.

and wherein *a, b, c* and *d* are hydrocarbon groups preferably containing up to 10 carbon atoms, or hydrogen with at least one of the groups being a hydrocarbon group. Many of these hydrocarbon groups contain additional nitrogen groups such as hydrazide, amido, nitro, nitrile, and the like.

Blowing agents for use in the invention must be decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. With the preferred vinyl polymers, a blowing agent decomposing between about 300° and about 450° F can be used. The degree of foaming of a typical plastisol formulation using different concentrations of blowing agent is shown in TABLE I.

TABLE I

| Parts by Weight of Azodicarbonamide Per 100 parts by Weight Resin | Ratio of Foam Thickness to Original Thickness | Density. Lbs Per Cu. Ft. |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from 15 to 50 pounds per cubic foot produces the most useful products. The thickness of the foam layer will depend in large measure on the final product desired. As a general rule foam thicknesses of about 0.005 to about 0.150 inch are particularly useful.

The coating compositions can contain pigments in accordance with the particular color desired. Any of the organic and inorganic pigments well known in the art for pigmenting compositions can be used. Normally, from about 0.5 to about 5 parts pigments per 100 parts resin are used.

It is common practice to add accelerators or catalysts to the compositions to accelerate the decomposition of the blowing agents, reduce the decomposition temperature and/or narrow the decomposition temperature range. Typical types of accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercaptobenzothiazole, zinc octoate, zinc naphtholate, zinc dust, and cadmium octoate. These agents can also serve as stabilizers for the composition.

Minor amounts of stabilizers are usually incorporated in the coating compositions to reduce the effects of degradation by light and heat. Suitable light stabilizers include resorcinol disalicylate, resorcinol dibenzoate, phenyl phthalate, phenyl benzoate, O-tolyl benzoate, eugenol, guaiacol, o-nitrophenol, o-nitroaniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like glycerine, leucine, alanine, o- and p- aminobenzoic and sulfanilic acids, hexamethylene tetramine, weak acid radicals including oleates, ricinoleates, abietates, salicylates and the like.

If volatile diluents are used to reduce the viscosity of the coating composition, care must be taken that they are essentially removed from the film prior to fusion and foaming. This removal can be accomplished by heating the composition at a temperature substantially below the fusion temperature and minimum decomposition temperature of the foaming agent for sufficient time to remove the volatile material.

The backing utilized for the resinous coatings is usually a flexible sheet. Suitable flexible backing sheets include those formed of flexible resinous composition as well as sheets of woven fabric and impregnated felted fibers. It has been found that felted cellulose or asbestos fibrous sheets impregnated with a water resistant and strengthening saturant yield particularly desirable backing sheets for the production of products in accordance with the invention. The particular impregnant or saturant chosen must not only be capable of imparting strength and water resistance to the sheet of felted fibers, but must also meet the requirements of high temperature stability. The impregnant should be free of volatile components and must not soften to such an extent as to exude from the sheet. In addition, the saturant should not be subject to appreciable detrimental chemical changes such as oxidation. Some resin impregnants which produce a felted sheet with excellent physical properties are not compatible with the coating compositions to be applied. This may result in poor adhesion of the coatings to the base. In such cases, it is desirable to size the surface of the impregnated felt sheet to which the foamable composition is to be applied with a thin coating of material which has good adhesion to both the felt impregnant and the foamable composition. Acrylic polymers have been found particularly effective in aiding adhesion without causing sticking of the sized surface to the rolls during the processing. Suitable resins for use as impregnants include vinyl resins and its copolymers, acrylic resins, polyethylene, polystyrene, butadiene — styrene copolymer, butadiene — acrylonitrile copolymer, natural rubber, polymerized chloroprene and the like. Thermosetting resins such as phenolic resins, polyesters, oleoresins, polyurethane resins and the like are suitable.

If the desired textured effects are to be accomplished through the chemical inhibition method the inhibitors are incorporated in the inks where necessary. The inhibitor for the blowing agent alters the decomposition temperature of the blowing agent in the area of the foamable composition where it is applied. By varying the concentration of the inhibitor, the thickness of its application or its penetration, the degree of suppression or acceleration of the decomposition of the blowing agent can be controlled to produce foam layers of varying degrees of thickness.

The inhibitor is preferably applied in a liquid carrier which allows for better control of the concentration of inhibitor applied. If the inhibitor is not soluble in the carrier, it can be dispersed with the carrier in the conventional paint-making technique to produce a fine dispersion.

Compounds which have been found to be effective as inhibitors to alter decomposition temperatures for blowing agents which contain linkages are the following groups:
(1) Organic acids, maleic, fumaric, trimellitic and the like.
(2) Organic acid anhydrides.
(3) Organic acid halides.
(4) Polyhydroxy alcohols.
(5) Carbohydrates.
(6) Nitrogen containing compounds as amines and amides and their derivatives.
(7) Sulfur containing compounds such as thiols, mercaptans, sulfides and their derivatives.
(8) Isocyanates and their derivatives.
(9) Aldehydes and Ketones and their derivatives.
(10) Phosphate and Phosphite compounds and their derivatives.

The following examples are given for purposes of illustration and wherever "PARTS" are designated, it is parts by weight unless otherwise noted.

EXAMPLE I TYPICAL FOAMABLE PLASTISOL FORMULATION

| INGREDIENTS | parts |
|---|---|
| Polyvinyl chloride (dispersion grade, specific viscosity 0.60) | 50 |
| Polyvinyl chloride (dispersion grade, specific viscosity 0.40) | 50 |
| Butyl Benzyl Phthalate | 40 |
| Di (2-ethylhexyl) phthalate | 20 |
| Titanium Dioxide | 7 |
| Azodicarbonamide | 2.5 |
| Dibasic lead phosphite | 1.5 |
| V.M. & P. naphtha (Boiling Range 190 to 275° F) | 5 |

EXAMPLE II TYPICAL CLEAR VINYL OVERCOAT PLASTISOL

| INGREDIENTS | PARTS |
|---|---|
| Polyvinyl chloride (dispersion grade, specific viscosity 0.50) | 100 |
| Alkyl aryl modified phthalate ester (plasticizer) | 38 |
| Epoxidized Tall oil ester (secondary plasticizer) | 5 |
| 2 2, 4 - trimethyl - 1, 3 - pentanediol diisobutyrate | 7 |
| Stabilizer | 3 |
| V. M. & P. Naphtha (Boiling Range 190 to 275° F) | 5 |

EXAMPLE III TYPICAL INHIBITING INK FORMULATION

| INGREDIENTS | PARTS |
|---|---|
| Vinyl Chloride - vinyl acetate copolymer | 12.2 |
| Pigments | 11.1 |
| Methyl Ethyl Ketone | 61.7 |
| Trimellitic Anhydride (Inhibitor) | 15.0 |

EXAMPLE IV TYPICAL INK FORMULATION

| INGREDIENTS | PARTS |
|---|---|
| Vinyl Chloride - vinyl acetate copolymer | 12.5 |
| Pigments | 12.5 |
| Methyl Ethyl Ketone | 75.0 |

EXAMPLE V TYPICAL PLASTISOL FOAM FORMULATION FOR PRINTING PLASTISOLS

| INGREDIENTS | PARTS |
|---|---|
| Polyvinyl chloride (dispersion grade, specific viscosity 0.60) | 35 |
| Polyvinyl chloride (dispersion grade, specific viscosity 0.40) | 35 |
| Polyvinyl chloride (suspension grade, specific viscosity 0.35) | 30 |
| Alkyl aryl modified phthalate ester (plasticizer) | 55 |
| Alkyl aryl hydrocarbon (secondary plasticizer) | 10 |
| Cadmium zinc phosphite stabilizer-activator | 1.5 |
| Titanium Dioxide | 5.0 |
| Azodicarbonamide | 1.7 |

The invention focuses on the use of actinic radiation curing, preferably ultra-violet radiation, to polymerize a coating over a conventional cushioned vinyl sheet goods flooring product which substantially upgrades the product as to gloss retention, scratch and scuff resistance, stain resistance, flexibility, abrasion resistance, and tack free surface with excellent see-through clarity.

There are many irradiation techniques which can be employed to initiate curing and to promote cross linking of surface coatings. Electron beam, gamma and x-ray treatment are examples of very high energy irradiation techniques which promote extremely rapid polymerization and are not recommended for purposes of this invention unless used at low energy levels.

For purposes of this invention, ultra-violet radiation is the preferred source. Ultra-violet radiation induces a photochemical reaction which produces free radicals from the photo-initiators present in the photocurable formulation. These free radicals in turn cause polymerization of the monomers, reactive pre-polymers, and inert polymers present resulting in a cured film.

Sources of ultra-violet radiation can be mercury vapor arc lamps, plasma arcs, pulsed xenon lamps and carbon arcs. Mercury vapor arc lamps are currently the most commonly used and consist of three types: Low; Medium; and High pressures. High pressure mercury arc lamps are the most intense source of ultra-violet being ten times more powerful than the medium pressure lamps, but they operate at very high temperatures, thus water cooling is generally required which may lead to instability and variable intensity. Also, because of their high operating temperatures, they only have a useful life of about 200 hours. The medium pressure mercury arc lamp will operate at a lower temperature than the the high pressure lamp and will have a useful lifetime of at least 1,000 hours. While the medium pressure mercury arc lamp operates at lower temperatures than the high pressure lamps, temperatures of 800° C are still attained and cooling must be accomplished efficiently. Air or water is generally used for cooling purposes.

Low pressure mercury arc lamps operate at near room temperature and have a useful lifetime of 2,500 to 12,000 hours. They emit two levels of radiation centered at 254 nm and 185 nm, but intensity is too low.

The medium pressure mercury arc lamps are the most commonly accepted because they offer much greater efficiency than low pressure mercury arc lamps and longer life than the high pressure mercury lamps. Not only do mercury arc lamps generate ultra-violet radiation, they also emit in the infra-red and visible region. Infra-red radiation will not initiate polymerization, but does assist in propagation once initiation has been achieved.

Efficiencies of up to 50% have been claimed for ultra-violet generation of medium pressure mercury arc lamps. A lamp which generates a high percentage of ultra-violet radiation will generate a proportionately lower amount of visible and infra-red radiation and vice versa.

Lamps operating at a low vapor pressure (in the medium pressure range) require a higher amperage and generate a higher percentage of ultra-violet radiation. Lamps operating at a high vapor pressure (in the medium pressure range) require a higher voltage and generate more infra-red radiation; thus the ultra-violet output in a selection of medium pressure arc lamps will vary. The choice of lamps may well depend on the type of system to be cured.

Specific wavelengths of light most effective will vary depending upon the coating employed and the particular photo-sensitizer package employed. Generally speaking, wave lengths in the range of 2,500 to 4,000 angstroms are suitable.

The components of an ultra-violet curable formulation generally contain an unsaturated resin, a reactive monomer, a multifunctional monomer, and a photo-initiator. The multifunctional monomer serves a dual role as the crosslinking agent and as the reactive solvent. In most cases, the type of unsaturated resin will affect the properties of the ultra-violet coating more than either the reactive monomer or the multifunctional monomer.

The unsaturated resins are usually low molecular weight polymers or "oligomers" containing a functional group which participates in the polymerization process. The unsaturated resins commonly employed are such compounds containing polar groups preferably urethanes. However, polyethers, epoxies, amides and the like terminated by two or more photopolymerizable ethylenically unsaturated groups which are preferably of the acrylic type can be employed.

The monofunctional monomers employed are important to the final film properties such as flexibility, adhesion, toughness and hardness. The monofunctional monomers lower the viscosity of the ultra-violet curable formulation. The monofunctional monomers are also extremely important to the cure rate of the system. For instance, acrylate monomers cure approximately ten times faster than methacrylate monomers which, in turn, are more responsive than vinyl esters, vinyl ethers or styrenes. Monomers that can be polymerized according to this invention have at least one polymerizable ethylenically unsaturated group of the structure.

>C=C<

Of these monomers the preferred are those containing at least one acrylyl group of structure.

CH$_2$=CHCO—

Illustrative of which one can mention, acrylic acid, methyl acrylate, ethyl acrylate, butyl acrylate, hexyl acrylate, 2-ethylhexyl acrylate, butoxyethyl acrylate, dicyclopentenyl acrylate, isodecyl acrylate, 2-phenoxyethyl acrylate, glycidyl acrylate, 2-ethoxyethyl acrylate, 2-methoxyethyl acrylate, 2-(N, N-diethylamino) ethyl acrylate, trimethoxyallyloxymethyl acrylate, vinyl acrylate, 2-hydroxypropyl acrylate, 2-hydroxyethyl acrylate, (methylcarbamyl) ethyl acrylate. The acrylyl compounds are well known and the above listed are only illustrative; any photo-curable compound containing an acrylyl group is suitable for use.

In addition to acrylyl monomers, one can also mention the methacrylyl monomers, nitriles, olefins, vinyl halides, vinyl esters, vinyl ketones, vinyl ethers and thioethers, miscellaneous sulfur and nitrogen containing monomers. Other photo-curable monomers are readily apparent to one skilled in the art of polymerization chemistry. The specific compounds mentioned are illustrative only and not all-inclusive. Multifunctional monomers are added along with monofunctional monomers when it is desired to increase the cross-link density of the coating. The multifunctional monomers are preferably of the acrylyl type such as neopentyl glycol diacrylate, pentaerythritol triacrylate, 1, 6-hexanedioldiacrylate, trimethylolpropane triacrylate. The multifunctional acrylic monomers listed are for illustrative purposes only. As with the mono-functional monomers listed above, any multi-functional monomers capable of curing on exposure to radiation are suitable.

The photo-initiator system is a vital part of the ultra-violet curable formulation. Photo-initiators are compounds which will absorb radiation and convert the absorbed energy to a reactive triplet state which is a free radical and thus extremely reactive. One type of photo-initiator system utilized is by hydrogen abstraction. The existence of the carbonyl group is mainly responsible for the special properties of this photo-initiator system. Situated on the oxygen atom of the carbonyl group is a lone pair of electrons occupying a non-bonding orbital. The non-bonding orbital is an electronic transition which confers free radical properties on the carbonyl group. The photo-activated carbonyl group must interact with another substance which can donate a hydrogen atom.

Compounds which, in addition to the carbonyl group, contain other hetero atoms or groups which also have a lone pair of electrons associated with them seem to have a synergistic effect and the photo-activity of the carbonyl center is enhanced. Examples are:

Thioxanthone  Michlers Ketone

Another type of photo-initiator system undergoes heterolytic fission to break the carbon to carbon bond within the molecule as illustrated by the following:

Air inhibition or oxygen effect on ultra-violet curing will rapidly terminate the free radical polymerization. The reason for this is that oxygen is a radical in its group state, hence its high reactivity towards other radicals. The reaction of oxygen with initiator and growing polymer radicals produces peroxy radicals ($PO_2^*$) which undergo H-abstraction from a hydrogen donor thereby terminating the chain. The overall effect is the formation of short polymer chains resulting in a tacky surface with poor coating characteristics. The faster the propagation, the less important is reaction with oxygen. A very active coinitiator with benzophenone type photo-initiator is a very reactive hydrogen donor. Tertiary amines are very reactive hydrogen donors in combination with benzophenone. The "alpha" amino radical formed reacts with oxygen levels in the coating as well as at the immediate surface.

Illustrative of such photo-initiators are benzoin, benzil, and benzoin ethers; polycyclic aromatic ketones i.e., benzophenone and its derivatives. Amines used as photo-synergists in combination with polycyclic aromatic ketones give remarkable acceleration of cure rate. Certain halogenated compounds have been found to be very effective photo-initiators. Other photo-initiators worthy of mention are mercapto compounds, amine oxides and phosphine derivatives.

Photo-initiators are employed in amounts from about 0.5% to 20% more commonly 1% to 5%. In selection of photo-initiator, those having high extinction coefficients at wavelengths which correspond to the emission band of the curing lamps, will be the most effective in promoting polymerization.

The combination of properties for a polymerizable coating which is intended to fall under the scope of this invention are excellent adhesion of the coating to the cushioned vinyl sheet goods substrate, together with the proper balance of thermoplastic properties to give excellent gloss retention, scratch resistance, scuff resistance, stain resistance, flexibility, abrasion resistance, tack free surface and excellent seethrough clarity which substantially upgrades the conventional sheet goods vinyl flooring.

Illustrative of the type of photo-curable formulation in accordance with this invention: Example I;

A photo-curable coating composition was produced having the following formulation in parts by weight.

| | |
|---|---|
| Acrylated Pluracol TP-340 (BASFWYANDOTTE POLYETHER AVERAGE MOL. WGT 300) | 65 |
| 1,6-Hexanediol Diacrylate | 20 |
| Isodecyl Acrylate | 10 |
| Benzoin Butyl Ether | 2.5 |

The acrylated polyether was the reaction product of (10 moles) ethyl acrylate and (1 mole) of Pluracol TP 340. Both 0.29 gram phenothiazine and 0.14 gram nitrobenzene were added as thermal polymerization inhibitors. The reactants were heated to 103° C pot temperature at which temperature the water/ethyl acrylate azeotrope was removed. Pot temperature was cooled to 50° C and 14.5g of DuPont Tyzor TPT organotitanate complex catalyst was added. The reaction was allowed to increase slowly to a maximum of 130° C. At this point, the reactants were vacuum stripped of excess ethyl acrylate. The pot residue was mixed well with 1 gram water to destroy the catalyst and then filtered to remove the spent catalyst.

Curing of 2.5 mils of the coating composition was accomplished in a nitrogen atmosphere by exposing for no more than 2 seconds irradiation with a 200 watt/inch Hanovia medium pressure mercury vapor lamp.

EXAMPLE II

A photo-curable coating composition was produced having the following formulation in parts by weight.

| | |
|---|---|
| Urethane Oligomer | 60 |
| Neopentyl Glycol Diacrylate | 15 |
| (Methyl Carbamyl) Ethyl Acrylate | 35 |
| Benzophenone | 2.5 |

The urethane oligomer was the reaction product at about 40° to 50° C of one mole of poly (epsilon-caprolactone) having an average molecular weight of about 550 (which was produced by reacting epsilon - caprolactone using trimethylolpropane as the starter), 3 moles of isophorone diisocyanate and 3 moles of 2-hydroxyethyl acrylate. 2.0 mils cured to a dry film upon exposure to 2.2 kilowatts medium pressure mercury lamps in a nitrogen atmosphere.

EXAMPLE III

A photo-curable coating composition was produced having the following formulation in parts by weight.

| | |
|---|---|
| Methacrylated Polyester | 50 |
| Pentaerythritol Triacrylate | 25 |

-continued

| Trimethylolpropane Triacrylate | 15 |
| Acrylonitrile | 5 |
| B-Hydroxyethyl Acrylate | 10 |
| 2, 5-Acetophenone | 2.5 |

The methacrylated polyester was prepared from polyester consisting of 2 moles of 1, 6-hexanediol, 2 moles of adipic acid and 1 mole of isophthalic acid reacted with 2 moles of glycidyl methacrylate. Phenothiazine (0.05g) and nitrobenzene (0.025g) were added to the glycidyl methacrylate monomers to inhibit premature polymerization. The glycidyl methacrylate was added over a 1 hour period controlling the exotherm to 100° C. Upon completion of the addition, the reactants were held at 100° to 105° C until an acid number of 18 was obtained.

Curing of 1.0 mil was accomplished upon exposure to 2 - 200 watt/inch medium pressure mercury lamps for 4 seconds under a nitrogen blanket.

EXAMPLE IV

| Acrylated Epoxy Resin (Shell Chemical DRH-302 Bisphenol A Epichlorophydrin Resin) | 30 |
| Neopentyl Glycol Diacrylate | 45 |
| 2-Ethylhexyl Acrylate | 35 |
| Benzyldisulfide | 3.5 |

The acrylated epoxy resin was a conventional epoxypolymer which was further reacted with acrylic acid to impart acrylic type terminal unsaturation to the polymer.

2.0 Mils was cured in a nitrogen atmosphere upon exposure to 2 - 200 watt/inch medium pressure mercury lamps.

EXAMPLE V — AIR CURED COATING

| Urethane Adduct | 30 |
| Acrylated Epoxidized Soyabean Oil | 20 |
| (Methylcarbamyl) Ethyl Acrylate | 40 |
| Neopentyl Glycol Diacrylate | 10 |
| 2-Chlorothioxanthone | 2 |
| Methyldiethanolamine | 3 |

The urethane adduct was prepared by reacting at 40° to 45° C 1.0 mole of trimethylhexamethylene diisocyanate dissolved in 0.1 mole of 2-phenoxyethyl acrylate with 2 moles of 2-hydroxyethyl acrylate. The acrylated epoxidized soyabean oil had an average of 2.2 acrylyl groups.

1.0 mil films were cured in air upon exposure to 2.2 kilowatts medium pressure mercury lamps.

EXAMPLE VI

| Acrylated Amine | 80 |
| N-Vinylpyrollidone | 20 |
| Benzophenone | 3.0 |

The acrylated amine was prepared from a mixture of 53.5 grams diethylene glycol diacrylate and 8.6 grams of piperazine in 22 ml. of anhydrous methanol at 20° C for one hour. After one hour, the methanol was stripped leaving a colorless liquid acrylated amine. Curing took place upon 3 second exposure under a 550 watt medium pressure mercury arc in a nitrogen atmosphere.

It will be appreciated that the examples herein presented of ethylenically unsaturated polymer materials for ultra-violet curing which meet the necessary prerequisites for coatings covered under this invention are given for illustrative purposes only. Other polymeric coating constituents capable of meeting the necessary prerequisites are also applicable.

For example, U.S. Pat. No. 3,699,084 describes a polyene having a molecule containing at least two unsaturated carbon to carbon bonds disposed at terminal positions on a main chain backbone of the molecule and a polythiol component having a molecule containing a multiplicity of pendant or terminally positioned — SH functional groups per average molecule and capable of curing in the presence of chemical free radical generation such as:

90 PARTS

POLYESTER-URETHANE DIENE

10 PARTS

PENTAERYTHRITOL TETRAKIS (THIOGLYCOLATE)

1 PART

PHOTO-INITIATOR

U.S. Pat. No. 3,509,234 to Burlont describes, radiation curable coatings comprising vinyl monomers and a resin formed by first reacting a hydroxylated polymer consisting essentially of carbon, hydrogen and oxygen with one — NCO group from diisocyanate monomers to provide an isocyanate terminated polymer and subsequently reacting the remaining — NCO group of said diisocyanate monomers with a hydroxy alkylacrylate or hydroxy alkyl methacrylate monomer, thereby introducing into said resin, alpha, beta olefinic unsaturated groups each of which are separated from the principal carbon to carbon chain of said resin by two urethane groups such as:

It is also known in the art, as set forth in U.S. Pat. No. 3,923,523, that a photo-curable composition can be obtained from a polyol having a photo-polymerizable alpha, beta-unsaturated ester group and a polycarboxylic acid anhydride such as pyromellitic acid anhydride along with a photo-polymerization initiator and optionally, a photo-polymerizable monomer such as: (0.1 mole) of the reaction product of neopentyl glycol diglycidyl ether and acrylic acid (molar ratio ½) was dissolved in 70g of N-vinyl-pyrralidone and (0.1 mole) of pyromellitic acid dianhydride was added to the solution with agitation. Then the mixture was reacted at room temperature for 24 hours. A polyester solution having a viscosity of 13,200 poise at 25° C was obtained.

The photo-curable composition was prepared by adding 37.8 parts (by weight of the composition) of trimethylolpropane triacrylate, 2 parts of benzoin-methyl ether to 60 parts of the obtained polyester solution. The composition was cured to a 1.0 mil film upon exposure to a 500 watt high pressure mercury lamp at a distance of 30cm requiring 0.3 seconds.

The present invention, it should be noted, does not reside in any particular class of ultra-violet coatings. It will be appreciated, by those skilled in the art, that not all photo-curable coatings are suitable for the prerequisite characteristics set forth in this invention. For example, there are coating compositions that degrade quickly, and take a prolonged residence time and, would not be consistent with the process. Other coatings would be too brittle, have poor stain, poor gloss retention and wear properties and the like.

Ultra-violet curable coatings having the necessary characteristics set forth in this invention displaying superior gloss retention, scratch and scuff resistance, stain resistance, flexibility, abrasion resistance, tack free surface and excellent see-through clarity, will fall within the following ranges:

Tensile Strength PSI: 2,000 – 4,000 psi
% Elongation: 15 – 50%
Young's Modulus: 30,000 – 90,000

Preferable results are obtained when physical properties are:

Tensile Strength: 2,900 PSI
% Elongation: 26%
Young's Modulus: 61,000

Ultra-violet coatings out of the range of physical properties listed above will not be suitable as a coating over cushioned vinyl sheet goods flooring products. In formulating a coating over a substrate, it is extremely important to match the coating to the substrate. For instance, Baranion Pat. No. 3,924,023 teaches application of a photo-polymerizable coating over rigid vinyl asbestos and asphalt tile. Because the vinyl tile is rigid and, as such, has no give when exposed to walking traffic, all of the energy is absorbed by the surface of the tile making it necessary to formulate a very hard ultra-violet coating. In order to accomplish this, elongation would be very little (approximately 5% range) making for a rather brittle coating. This would be unacceptable for cushioned sheet goods vinyl flooring.

On the other hand, cushioned vinyl sheet goods flooring is a softer flexible foamed substrate completely different from that of a rigid vinyl tile. As such, when exposed to walking traffic the energy is absorbed by the foam rather than the surface as was true with the vinyl tile. With this in mind, softer, more flexible coatings are applicable to cushioned vinyl sheet goods flooring. If an ultra-violet curable coating which was formulated for rigid vinyl tile were coated on cushioned vinyl sheet goods, the coating because of its being hard and rather brittle would crack and peel from the flexible vinyl substrate. At the same time, if an ultra-violet curable coating which was formulated for cushioned vinyl sheet goods was coated on rigid vinyl tile, because of its being a softer coating, the wear resistance and gloss retention would be rather poor.

In the practice of the invention, an asbestos felt substrate is coated with a flexible foamable vinyl plastisol, heated to gel the foamable composition, afterwhich, a multi-colored decorative pattern is applied to the surface of the gelled coating. The thus printed vinyl gel is then coated with a clear vinyl overlay and passed through a high temperature oven (350° to 450° F) to completely fuse the clear vinyl overlay while at the same time expanding the flexible foam underlay to the required thickness. The expanded vinyl sheet, upon exiting the high temperature oven at 40 to 110 feet/minute line speed, is cooled to between 100° to 180° F, afterwhich, a 100% solids ultra-violet curable coating comprising the following:

Acrylourethane Oligomer 70
    2 — Ethylhexyl Acrylate 30
    hexanedialdiacrylate 4
    Benzoin Butyl Ether 1

The medium molecular weight isocyanate — terminated urethane oligomer was prepared in the 2 — ethylhexylacrylate monomer. A stoichiometric amount of hydroxyethylacrylate was added to accomplish the acrylate capping. The coated web is then passed through an ultra-violet lamping oven, appropriate gas sweep is employed, i.e., if the ultra-violet curable coating is one that requires a non-oxidizing environment nitrogen gas sweep is used. If the ultra-violet curable coating can be cured in air, an air sweep is employed. The web is then cooled and rolled for shipment.

The ultra-violet curable coating utilized will have physical properties which fall into the range of:

Tensile Strength PSI: 2,000 – 4,000
    % Elongation: 15 – 50%
    Young's Modulus: 30,000 – 90,000

The viscosity of the ultra-violet coating is extremely important to achieving the necessary leveling characteristics required.

It must be noted that the ultra-violet coating is being applied to an embossed surface and, as such, the coating should be of a consistency so that the coating will not fill in the valleys while leaving too thin a coating in the land areas. Also worthy of note, is an ultra-violet curable coating which requires an inert atmosphere for proper curing, if the viscosity of the coating is very low it will hold air at the surface of the coating which can inhibit proper surface cure and can result in a tacky surface.

Viscosities for ultra-violet curable systems are generally in the range of 3,000 to 15,000 cps at ambient temperatures. Much higher viscosity coatings have been used, however, very low viscosity coatings are generally avoided.

The ultra-violet curable coating can be applied by means of a direct roll coater, however, other means of application such as spray coating, curtain coating, extrusion coating and the like can be employed.

Nitrogen is the preferred gas sweep for ultra-violet curable coating requiring a non-oxidizing atmosphere. The volumes of nitrogen sweep maintained across the web will depend mainly on the line speed and the opening gap between the web and the lamps. If a high enough flow of nitrogen is not maintained to exclude oxygen, there can be some oxygen inhibition of surface cure which can result in a tacky surface with poor physical properties. Whether the ultra-violet coating be an air or nitrogen curable coating sufficient gas sweep (Nitrogen or air) is necessary because at operating temperatures in the range of 100° F to 180° F there is some volatilization of reactive monomers in the ultraviolet lamping oven which must be removed. Otherwise they will deposit on the lamps and reflectors and degrade. The resulting deposition and degradation of reactive monomers leads to loss of efficiency of the ultra-violet lamps and, consequently, can lead to incomplete cure. The gas sweep is such that it, in effect, sets up a laminar flow holding any monomer fumes on the moving web and exhausts said fumes out of the exit of the ultra-violet lamping oven.

The ultra-violet lamping oven is a series of medium pressure mercury arc lamps operating in the 1800A to 4000A wavelength range providing 750 watt per linear inch of ultra-violet radiation across the entire coated surface of the web. The amount of ultra-violet lamps and lamp intensity is governed by line speeds, coating chemistry, and thickness of coating.

It has been found necessary when employing certain acidic chemical inhibitors in the inks for chemical embossing that a barrier coat 23 must be applied over the thus printed sheet. The barrier coat traps any excess acidic inhibitor which would otherwise be present at the surface of the hot vinyl sheet prior to coating the ultra-violet curable coat. When acidic inhibitor is present the vinyl substrate-ultra-violet coating interface it acts to stabilize free radicals resulting in an uncured coating with very poor adhesion. Such barrier coats which have been found to be particularly effective have been low molecular weight polyvinylchloride resins, vinyl chloride — vinyl acetate copolymers, and acrylic resins. The thus ultra-violet coated cushioned sheet vinyl product will advantageously exhibit superior gloss retention, scratch and scuff resistance, abrasion resistance, stain resistance, and have a tack free dry surface with excellent see-through clarity and adhesion.

Gloss retention with respect to a cushioned vinyl sheet goods surface is the ability of that surface to retain its specular reflectance (gloss) values for a satisfactory service life while in use as a finished flooring surface. Laboratory methods which have been found helpful for comparison of flooring surfaces for gloss retention, utilize scrubbability testers. A flooring substrate is exposed to 125, 250 and 500 cycles on the scrub machine with 10 ml of a scrub solution. The degree of gloss loss is recorded as the number of cycles necessary to give initial visual gloss loss. The percent of gloss loss is recorded as the ratio difference between the initial and final gloss to the initial gloss.

Gloss retention testing of the coated cushioned sheet vinyl product gave results on the order of 2 times less gloss loss compared to the conventional cushioned sheet vinyl product.

A generally accepted method in the industry for evaluating scuff resistace is known as the "Heel Test". A heel is scraped over the surface of the flooring substrate a series of times (usually 5 to 10 times) and the surface is examined under a microscope for scuff marks and surface ruptures. The heet test shows scuffing of the conventional cushioned vinyl sheet surface, however, the ultra-violet coated surface was free from scuff marks using the same test.

Another test commonly accepted in the industry for scratch testing is called the "Dime Test". A dime is rubbed across the surface of the flooring substrate and the surface is examined for surface ruptures and scrapes. The conventional cushioned vinyl sheet shows scrape marks while the ultra-violet coated surface was free from marks.

Abrasion resistance of cushioned vinyl sheet goods is commonly determined by the mils of surface thickness lost per 1,000 cycles of a surface abrader. It is our opinion that the surface abrader is not as accurate a test as laying flooring substrate in a heavily trafficked area and visually observing after a reasonable period of time. However, it is a test that will evaluate relative differences in the flooring substrates.

Tests carried out with a taber abrader, 5000 cycles, CS-17 wheel, 1000gm load suction 60 showed abrasion resistance of the coated substrate to be on the order of 2.25 times less abrasion loss per given abrasion test cycles compared to the conventional cushioned vinyl sheet substrate.

Stain resistance of a flooring substrate is a measure of its resistance to the migration of materials placed in contact with the floor can result in permanent staining. Normal household materials which can come in contact with the flooring and result in a stain are such things as iodine, merthiolate, mercurochrome, mustard, lipstick, shoe polish and ink. Testing for stain resistance is usually carried out by applying a ¼ to ½ inch spot of stain. After six hours the stains are wiped off. Stains are rated visually. The ultra-violet coated cushioned sheet vinyl substrate was a marked improvement in every stain test for the above recited stains over the conventional cushioned vinyl sheet substrate.

The ultra-violet coated substrate displays a tack free surface. Normal vinyl sheet goods flooring contain plasticizers which will exude to the surface resulting in an oily surface which will attract and hold dirt. The ultra-violet coating does not contain plasticizers or anything that can become incompatible and exude to the surface. The ingredients in the ultra-violet coating are completely reacted upon exposure to ultra-violet radiation leaving a completely dry film.

The see-through optical clarity of color is improved with application of the ultra-violet coating resulting in a surface free from imperfections and property weakening voids.

Adhesion of the ultra-violet coating is excellent because there is a certain penetration of the wet coating into the clear vinyl undercoat which is chemically crosslinked upon exposure to ultra-violet radiation.

The invention thus represents an advance of major significance in the sheet goods vinyl flooring industry of providing an ultra-violet curable coating over a conventional cushioned vinyl sheet goods product which substantially upgrades the stain, gloss retention and wear properties and can be accomplished without the addition of extra processing steps.

Although particular embodiments of the invention have been shown and described in full here, there is no intention to thereby limit the invention to the details of such embodiments. On the contrary, the intention is to cover all modifications, alternatives, embodiments, usages and equivalents of the invention as fall within the spirit and scope of the invention, specification and the appended claims.

What is claimed is:

1. A process for producing a cushioned sheet goods product comprising the steps of:
    coating a substrate with a flexible foamable vinyl composition and heating to gel the foamable composition,
    applying a decorative pattern to the surface of the gelled coating,
    coating a clear vinyl overlay over the decorative pattern, and passing through a high temperature oven to fuse the clear vinyl overlay and expand the foam to the required thickness,
    cooling the sheet surface to a temperature which permits bonding with an actinic radiation curable coating,
    applying an actinic radiation curable coating composition which is essentially solvent free and comprises at least one organic compound having at least two photopolymerizable ethylenically unsaturated groups per molecule and capable of curing upon exposure to actinic radiation to form a continuous coating,
    exposing the thus coated sheet to actinic radiation until such coating has set,
    thereby achieving physical properties of the actinic radiation cured coating falling within the following range;

Tensile Stength PSI: 2,000–4,000
    Elongation %: Greater Than 15
    Young's Modulus: 30,000–90,000 whereby the stain resistance, scratch and scuff resistance, abrasion resistance and gloss retention properties are enhanced by adding the actinic radiation curable coating.

2. The process of claim 1, wherein the foamable coat includes polyvinyl chloride resins, plasticizers, blowing agent, pigment and activators proportioned to provide a blowing capability of at least 200%.

3. The process of claim 1, wherein the clear overlay atop the printed surface contains polyvinyl chloride resins, plasticizers, heat stabilizer, and light stabilizer.

4. The process of claim 1, wherein the substrate is an asbestos felt.

5. The process of claim 1, wherein the decorative pattern is applied by any of the conventional techniques such as silk screen, rotogravure, rotary screen and the like.

6. The process of claim 1, wherein embossing is accomplished through rotogravure application of chemical inhibitors in the printing inks.

7. The process of claim 1, wherein embossing is accomplished by mechanical means.

8. The process of claim 1, wherein embossing is accomplished by rotary screen printing of foamable plastisols.

9. The process of claim 6, wherein any excess chemical inhibitor is trapped under a barrier coat prior to application of the actinic radiation curable coating to preclude the inhibitor from inhibiting the bonding of the actinic radiation curable coating.

10. The process of claim 1, wherein the actinic radiation cured coating contains a reactive base polymer.

11. The process of claim 1, wherein the actinic radiation cured coating contains polar groups such as urethane, ethers, esters, amides, epoxies and combinations thereof.

12. The process of claim 1, wherein the actinic radiation coating comprises urethane groups.

13. The process of claim 1, wherein the actinic radiation cured coating contains a U.V. photo-sensitizer.

14. The process of claim 1, wherein the actinic radiation cured coating contains reactive monofunctional crosslinking monomers and multi-functional crosslinking monomers.

15. The process of claim 1, wherein the photo-polymerizable ethylenically unsaturated groups are acrylyl groups of the structure.

16. The process of claim 1, wherein the actinic radiation curable coating contains the polymerization product of a polyene and polythiol.

17. The process of claim 1, wherein the actinic radiation polymerization reaction takes place in a non-oxidizing environment.

18. The process of claim 1, wherein the inert gas is swept over the coated sheet to exclude oxygen and remove volatile monomers from contacting with the actinic radiation source.

19. The process of claim 1, wherein the actinic radiation polymerization reaction takes place in air.

20. The process of claim 18, wherein the air is swept over the coated sheet to remove volatile monomers from contacting with the actinic radiation source.

21. The process of claim 1, wherein the actinic radiation coating is between 0.0005 and 0.005 inches.

22. The process of claim 1, wherein the actinic radiation coating is applied to the substrate at 100° to 180° F making for excellent bonding properties.

23. The process of claim 1, wherein the physical properties of the actinic radiation cured coating fall within the following range:

Tensile Strength PSI: 2,000–4,000
Elongation %: 15–50
Young's Modulus: 30,000–90,000

24. The process of claim 1, wherein the physical properties of the actinic radiation coating are:

Tensile Strength PSI: 2900
Elongation %: 26
Young's Modulus: 61,000

25. The product of the process of claim 1.

26. A cushioned sheet goods comprising, in combination,
a flexible substrate,
a flexible foamable vinyl composition positioned atop the substrate and foamed,
a decorative pattern over the surface of the flexible foamed vinyl composition,
a clear vinyl overlay over the decorative pattern,
and a cured coating which is essentially solvent free and having at least one organic compound having at least two photo-polymerizable ethylenically unsaturated groups per molecule which is fully set,
wherein the physical properties of the cured coating fall within the following range:

Tensile Strength PSI: 2,000–4,000
Elongation %: Greater Than 15
Young's Modulus: 30,000–90,000

27. Cushioned sheet goods of claim 26 above wherein,
the foamable composition includes polyvinyl chloride resins, plasticizers, spent blowing agent, pigment, and activators blown to at least 200%.

28. The product of claim 26, wherein,
the clear overlay atop the decorated surface contains polyvinyl chloride resins, plasticizers, heat stabilizers, and light stabilizers.

29. The product of claim 26 above, wherein,
the substrate is an asbestos felt.

30. The product of claim 26, wherein,
embossing has been applied through the printed application of chemical inhibitors.

31. The product of claim 26, wherein,
embossing has been accomplished mechanically.

32. The product of claim 26, wherein,
embossing has been accomplished by rotary screen printing of foamable plastisols.

33. The product of claim 30, above,
wherein any excess chemical inhibitor is trapped under a barrier coat under the cured top coating to preclude the inhibitor from inhibiting the bonding of the top coating.

34. The product of claim 26, wherein,
the top coating comprises urethane groups.

35. The product of claim 26, wherein
the top coating includes in part the reaction product of reactive monofunctional cross-linking monomers and multi-functional cross-linking monomers.

36. The product of claim 26, wherein,
the top coating includes the polymerization product of a polyene and a polythiol.

37. The product of claim 26, wherein,
the physical properties of the top coating fall within the following range:

Tensile Strength PSI: 2,000–4,000
Elongation %: 15–50
Young's Modulus: 30,000–90,000

38. The product of claim 26, wherein,
the physical properties of the top coating are:

Tensile Strength PSI: 2900
Elongation %: 26
Young's Modulus: 61,000

* * * * *

UNITED STATES PATENT OFFICE
CERTIFICATE OF CORRECTION

Patent No. 4,100,318      Dated   July 11, 1978

Inventor(s) Thomas J. McCann and Ernest E. Regan

It is certified that error appears in the above-identified patent and that said Letters Patent are hereby corrected as shown below:

In the Specification:

Column 15, line 26, "Epichlorophydrin" should read Epichlorohydrin.

Column 16, line 58, "Burlont" should read "Burlant".

Column 17, line 35, "(molar ratio 1/2)" should read "molar ratio (1/2)".

Column 17, line 36, "pyrralidone" should read "pyrrolidone".

Column 18, line 36, "Baranion" should read "Boranion".

Column 19, line 11, "hexanedialdiacrylate" should read "Hexanedioldiacrylate".

Signed and Sealed this

Second Day of September 1980

[SEAL]

Attest:

SIDNEY A. DIAMOND

Attesting Officer    Commissioner of Patents and Trademarks